United States Patent
Wang et al.

(10) Patent No.: US 12,452,129 B2
(45) Date of Patent: Oct. 21, 2025

(54) METHOD OF, A PROVISIONER AND A SYSTEM FOR PROVISIONING A PLURALITY OF OPERATIVELY INTERCONNECTED NODE DEVICES IN A NETWORK

(71) Applicant: SIGNIFY HOLDING B.V., Eindhoven (NL)

(72) Inventors: Changjie Wang, Shanghai (CN); Lei Feng, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 286 days.

(21) Appl. No.: 18/034,707

(22) PCT Filed: Nov. 4, 2021

(86) PCT No.: PCT/EP2021/080615
§ 371 (c)(1),
(2) Date: Apr. 30, 2023

(87) PCT Pub. No.: WO2022/096561
PCT Pub. Date: May 12, 2022

(65) Prior Publication Data
US 2023/0396492 A1    Dec. 7, 2023

(30) Foreign Application Priority Data

Nov. 5, 2020   (WO) ................ PCT/CN2020/126849
Dec. 24, 2020  (EP) ..................................... 20217251

(51) Int. Cl.
*H04L 41/0806*   (2022.01)
*H04L 9/40*       (2022.01)

(52) U.S. Cl.
CPC ...... *H04L 41/0806* (2013.01); *H04L 63/0869* (2013.01)

(58) Field of Classification Search
CPC ................ H04L 41/0806; H04L 63/0869
(Continued)

(56) References Cited

U.S. PATENT DOCUMENTS 10,075,334 B1 * 9/2018 Kozura ............... H04W 12/086
10,116,501 B2 * 10/2018 Erdmann ............. H04W 24/02
(Continued)

FOREIGN PATENT DOCUMENTS

EP     3128475 A1 *  2/2017 ............. G06Q 10/10
EP     3128476 A1 *  2/2017 ............. G06Q 50/01
(Continued)

OTHER PUBLICATIONS

A. Menezes et al., "Handbook of Applied Cryptography", Chapter 13: Key Management Techniques ED, CRC Press Series on Discrete Mathmatices and its Applications, Boca Raton, FL, US, pp. 543-590, 1996. XP001525013.

*Primary Examiner* — Anthony Mejia

(57) ABSTRACT

A method of provisioning a particular type of node devices in a network is disclosed. The network comprises a plurality of operatively interconnected node devices of the particular type. Each of the particular type of node devices comprises a short range communication interface and configured for operating under control of a network backend server and an application backend server separate from the network backend server. The method performed by an application provisioner associated with the particular type of node devices, which first obtains device specific network provisioning data for the particular type of node devices from the network backend server, then obtains an application credential for the particular type of node devices; and thereafter provision the particular type of node devices by distributing the applica-
(Continued)

tion credential to each of the particular type of node devices over a short range communication interface of the particular type of node device.

14 Claims, 4 Drawing Sheets

(58) Field of Classification Search
USPC .......................................................... 709/222
See application file for complete search history.

(56) References Cited

U.S. PATENT DOCUMENTS

| | | | |
|---|---|---|---|
| 10,251,073 B2 | 4/2019 | Morchon et al. | |
| 10,306,473 B2* | 5/2019 | Roche | H04W 12/35 |
| 11,615,697 B2* | 3/2023 | Baum | G08B 25/08 |
| | | | 709/203 |
| 11,622,257 B1* | 4/2023 | Mars | A61B 5/01 |
| | | | 455/41.2 |
| 2017/0150362 A1* | 5/2017 | Clemenson | H04L 41/0806 |
| 2017/0339044 A1 | 11/2017 | Garcia Morchon et al. | |
| 2018/0032997 A1* | 2/2018 | Gordon | G06Q 30/0269 |
| 2018/0255506 A1 | 9/2018 | Wang et al. | |
| 2019/0037470 A1* | 1/2019 | Yeh | H04W 40/12 |
| 2019/0182938 A1 | 6/2019 | Schröder et al. | |
| 2019/0349252 A1* | 11/2019 | Hu | H04L 41/0895 |
| 2020/0077246 A1* | 3/2020 | Mars | G06Q 40/02 |
| 2020/0128395 A1* | 4/2020 | Mars | H04W 12/71 |
| 2024/0362302 A1* | 10/2024 | Wise | G06Q 30/04 |

FOREIGN PATENT DOCUMENTS

| | | | |
|---|---|---|---|
| EP | 3493502 A1 | 6/2019 | |
| EP | 3503670 A1 | 6/2019 | |
| WO | 2016150972 A1 | 9/2016 | |
| WO | 2016202375 A1 | 12/2016 | |
| WO | 2018148244 A1 | 8/2018 | |
| WO | 2019001713 A1 | 1/2019 | |
| WO | WO-2020249206 A1 * | 12/2020 | H04W 12/35 |

* cited by examiner

METHOD OF, A PROVISIONER AND A SYSTEM FOR PROVISIONING A PLURALITY OF OPERATIVELY INTERCONNECTED NODE DEVICES IN A NETWORK

CROSS-REFERENCE TO PRIOR APPLICATIONS

This application is the U.S. National Phase application under 35 U.S.C. § 371 of International Application No. PCT/EP2021/080615, filed on Nov. 4, 2021, which claims the benefit of European Patent Application No. 202172516, filed on Dec. 24, 2020, and Chinese Patent Application No. PCT/CN2020/126849, filed on Nov. 5, 2020. These applications are hereby incorporated by reference herein.

A method of, a provisioner and a system for provisioning a plurality of operatively interconnected node devices in a network.

TECHNICAL FIELD

The present disclosure generally relates to the field of managing interconnected node devices and, more specifically, to a method of, a provisioner and a system for provisioning a plurality of operatively interconnected node devices of a particular type in a network.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of interconnected devices.

These devices, generally called node devices or terminal devices, typically operate a long range communication interface, such as a network adapter or a transceiver module, for data exchange with remote devices, such as a backend server, and a short range communication interface, such as a transceiver module, for communication between node devices only, also called inter-node device communication.

The long range communication interface may operate in accordance with a wireless mobile communication standard, such as designated 2G/3G/4G/5G cellular communication, and other long-range wireless communication technologies like Long Range Wide Area Network, LoRaWAN, and Narrowband IoT, NB-IoT, or proprietary communication technologies, and/or a wired data exchange communication technology, for example.

The short range communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

US2019349252A1 relates to Bluetooth mesh network provisioning. Information reported by one or more gateway nodes in a Bluetooth mesh network regarding an unprovisioned Bluetooth device is received. Provisioning data for the unprovisioned Bluetooth device is generated. A destination Bluetooth gateway node to which to issue the generated provisioning data is determined from among the one or more gateway nodes reporting the received information. The generated provisioning data is issued to the destination Bluetooth gateway node so that the destination Bluetooth gateway node can perform a provisioning operation directed at the unprovisioned Bluetooth device.

WO2016202375A1 discloses a method, performed in a wireless device (60), for enabling a secure provisioning of a credential from a server (70). The wireless device (60) stores a device public key and a device private key. The server (70) stores the device public key. The method comprises receiving (S1) an authentication request from the server (70); generating (S2) a device authentication and integrity, DAI, indicator; and transmitting (S3) an authentication response to the (server70). The authentication response comprises the DAI indicator. The method comprises receiving (S4) a credential message from the server (70), the credential message comprising a server authentication and integrity, SAI, indicator. The SAI indicator provides a proof of the server's possession of the device public key. The method comprises verifying (S5) the received credential message using the device public key.

"Handbok of Applied Cryptography" (CRC Press, 1996) chapter 13 discloses key management techniques for controlling the distribution, use and update of cryptographic keys, focusing on communications models for key establishment and use, classification and control of keys based on their intended use, techniques for the distribution of public keys, architectures supporting automated key updates in distributed systems, and the role of trusted third parties.

Such a network may be a lighting system, such as an outdoor lighting system, comprising a large number of interconnected node devices arranged as lighting devices. Moreover, recent development in technologies enable a number of other devices, such as sensors, cameras and the like, with communication capabilities, to join and operate as a node device of the lighting system formed by the lighting devices as well.

The inclusion of the other type of node devices in the lighting system enables various applications and service beyond lighting, such as door access systems, smart speakers, for example. Such applications may involve a lot of device to device communications, with each application generating its own data.

In an indoor network with different type of node devices, different applications associated with or run by the node devices are normally owned by a same owner, such as for home usage, for example. Credentials of the applications, such as application keys in a Bluetooth mesh network, can therefore be managed by the same owner, and the owner is able to maintain and access the data and services belonging to different applications.

In contrast, in an outdoor network comprising different types of node devices, the different applications and the corresponding node devices may be owned by different business owners or organizations. As an example, surveillance cameras for traffic and street lighting devices are owned and managed by different organizations. In this case, data generated by and associated with different applications, when being communicated between node devices in the network, have to be protected from each other.

In an example of a Bluetooth mesh network, an application credential referred to as an application key is used by an application to secure communication at the Access Layer of the Bluetooth mesh network. The application key is generated during a commissioning or provisioning stage of the node devices in the network and distributed to and shared across all node devices which participate in a particular application.

In a network comprising node devices belonging to different application owners, each type or group of node devices uses a respective application key generated by the corresponding application owner to encrypt and decrypt respective application messages exchanged at the application layer of the network. The security consideration of protecting data for different applications from each other requires that the application keys for different types of node devices have to be maintained and kept to the respective applications and the corresponding node devices running the applications as well.

Keeping the application key to the corresponding application and the node devices has to be considered already when the node devices are provisioned or commissioned. Generally, there are two approaches of provisioning or joining a node device into a(n) (existing) network, the first being a standard approach of on-site provisioning via a provisioner, while the second approach may be performed automatically under control of a backend server, by using a node device having long range communication capability as a proxy node.

An example of provisioning a node device in a standard Bluetooth Mesh network comprises employing a provisioner to distribute all information of the network including a network key NetKey unique to the network and an application key AppKey unique to each particular application to all node devices in a network. This is not desired for a network comprising node devices belonging to different applications, as the different node devices are owned by different application owners and the corresponding AppKey should be only known to the application owner and the related node devices.

With the auto provisioning method, newly added node devices may be provisioned into the network via a selected proxy node device, which implies that information about the node devices, such as NetKey and AppKey in a Bluetooth network, will be transmitted via the proxy node device. This is not acceptable either, as the proxy node will thereby know the AppKey of the thus-provisioned node devices.

Accordingly, there is a need for a method of securely managing application credentials for different type of node devices in a same network, especially from an early stage when node devices of different types and belonging to different entities are commissioned or provisioned.

SUMMARY

In a first aspect of the present disclosure, there is provided a method of provisioning a plurality of operatively interconnected first type node devices in a network, each first type node device comprising a short range communication interface and configured for operating under control of a network backend server and an application backend server separate from the network backend server, the method performed by an application provisioner associated with the first type node devices and comprising the steps of:
  obtaining device specific network provisioning data for and identifying the first type node devices from the network backend server;
  obtaining an application credential for the first type node devices, the application credential being known to the application backend server and unknown to the network backend server; and
  provisioning the first type node devices by distributing the application credential to each of the first type node devices over a short range communication interface of the first type node device upon successfully mutual authentication with the first type node device using the device specific network provisioning data.

In a network comprising different types of node devices configured for different service and applications and operated and owned by different entities, different types of node devices share a same network credential but have different application credentials. For security considerations, an application credential for one type of node devices configured for one application should be protected from node devices of other types. It is the inventor's insight that such application credentials for the different type of node devices can be managed separately and independently of each other by provisioning each type of the node devices with the respective application credential or security key directly, via short range communication interfaces of the particular type of node devices.

The application credential is directly distributed from an application provisioner, specially associated with a particular type or group of node devices, here referred to as the first type node devices, to this particular type or group of node devices by using short range communication interfaces of the node devices. The particular type or group of node devices will accept the application credential upon successful authentication of the identity of the application provisioner. It therefore obviates the transmission of the application credential via other type of node devices in the same network, thereby reducing the risk of having the application credential compromised by other type of node devices in the network.

The network backend server, which is in control of each and every node device of different types in the network, has a whole picture of the network and maintains network provisioning data, including the network credential, device credentials and device identifications, IDs etc. The application provisioner can therefore download a part of the network provisioning data, also referred to herein as device specific network provisioning data, for the particular type of node devices from the network backend server, which identifies the node devices that the application provisioner is associated with. The device specific provisioning data for the particular type of node devices received from the network backend server is also used to authenticate the application provisioner to the particular type of node devices.

Thereafter, the application provisioner obtains the application credential, such as an application key, in the case that the network is a Bluetooth network, for the particular type of node devices. The thus obtained application credential is maintained by the application backend server which manages the application and therefore also the first type node devices running the application. Unlike the network provisioning data, the application credential is not obtained from the network backend server, which means even the network backend server does not know the application credential. This strengthens the secure management of the application credential.

The application provisioner can then distribute the device specific application credential to the particular type of node devices directly, via short range communication interfaces of the particular type of node devices. This completes the provisioning procedure of the particular type of node devices.

The application provisioner may be readily obtained from the network backend server for example under agreement between the different entities owning the different type of nodes. Alternatively, an external source such as a public directory at an APP store or a website designated by the owner of the application and the corresponding node devices may provide the application provisioner.

The application credentials for different types of node devices in the network can therefore be protected from each other type of node devices and even from the network backend server, which ensures that the application data and signaling messages for different type of node devices running different applications are well protected and safe.

In an example of the present disclosure, each first type node device is joined to the network under control of the network backend server, prior to the step of obtaining the device specific network provisioning data for the first type node devices.

As described above, the network backend server is in control of each and every node device in the network, this is realised by joining each node device to the network, after the node device is installed and powered on. The node device and network backend server during this procedure authenticate each other and exchange network provisioning data necessary for subsequent operations of the node devices.

In an example of the present disclosure, the network further comprises a plurality of operatively interconnected and provisioned second type node devices, each of the second type node devices comprises a short range communication interface and a long range communication interface, each first type node devices is joined to the network by communication, with the network backend server, over the short range communication interface of the first type node device and a long range communication interface and a short ranged communication interface of at least one of the second type node devices functioning as a proxy node device for the communication.

As an example, an existing network with lighting devices may be extended to include other type of devices, such as cameras and sensors. In this case, a sensor or camera, after being installed and powered on, may be joined into the existing network using a lighting device as a proxy node device. The proxy lighting device is provided with both short and long range communication capabilities, for communicating with the sensor or camera to be joined to the existing network in short range and with the network backend server in long range. The sensor or camera can therefore be joined to the existing network automatically, saving cost and resources in terms of man power.

It can be contemplated that the method is also applicable to a scenario when a network is built from scratch, in which case node devices with both short range and long range communication capabilities may be joined to the network under control of the network backend server first, before being used as a proxy node device for joining other node devices with short range communication capability only into the network.

In an example of the present disclosure, the device specific network provisioning data for the first type node devices is generated during a network joining process and comprises a unique device identification and a corresponding device credential of each of the first type node devices.

When a node device of the first type is joined to the network under control of the network backend server, in addition to the network key provisioned by the network backend server, a device credential such as a device key, generated for example by the node device or by the network backend server, is also shared between the network backend server and the node device. A unique device identification such as a network address is also allocated for the node device. Such data is available from the first provisioning stage of joining the first type node device into the network and will be used as the device specific network provisioning data for provisioning the node device into an associated application at a later stage.

In an example of the present disclosure, the device specific network provisioning data is obtained from the network backend server via the application backend server.

The application backend server is responsible for specific application management. It may authenticate itself and therefore the ownership of the first type node devices to the network backend server. Thereafter, the application backend server may download or retrieve the device specific provisioning data from the network backend server and has the same stored to the provisioner. This ensures that the correct device specific network provisioning data is retrieved and remains secure and safe.

Alternatively, the application provisioner may also obtain the device specific network provisioning data directly form the network backend server, upon authentication of the identity of the application provisioner and accordingly the application ownership.

In an example of the present disclosure, the received application credential is generated by the application backend server.

The application backend server, after receiving the device specific network provisioning data for the particular type of node devices from the network backend server, will generate an application credential specially for the particular type of node devices, such as an application key in the case of a Bluetooth mesh network. The credential is stored in the application backend server and also in the application provisioner. It is thereby ensured that the application credential is generated and maintained only for the particular type or group of node devices.

Alternatively, in another example of the present disclosure, the application credential is generated by the application provisioner associated with the first type node devices.

The application credential generated in this way is also stored in the application backend server, which also helps to ensure the secure management of the application credential.

The application credential is then distributed to each of the particular type of node devices over a secure communication channel at the short range communication interfaces of the particular type of node device.

The application provisioner may set up secure communication channels with the particular type of node devices, which is advantageous from a security perspective, as it helps to avoid the application credential for securing application data transmitted over the network from become available to unauthorized third parties, for example. This strengthens the secure aspect of the distribution of the application credential as well as subsequent data exchange at the application layer between different types of node devices in the network.

As described above, the application provisioner and each of the first type node devices mutually authenticate each other using the device specific network provisioning data for the first type node device, before the distribution of the application credential to the first type node devices.

The authentication between the application provisioner and the node device of the particular type is based on the unique network address and the device credential of the node device. The device credential is therefore also used to protect the secure transfer of the application credential from the application provisioner to the first type node device. In such a way, even if other standard provisioning tools such as from an attacker may get connected to the first type node device, via the short range communication interface, as it cannot authenticate itself to the node, the transfer of a fake application credential to the node device is not possible.

In an example of the present disclosure, the method further comprises the steps of:
- obtaining an updated application credential for the first type node devices; and
- updating the application credential of the first type node devices with the updated application credential.

It can be contemplated by those skilled in the art that periodic or on-demand update of security credentials in a network may be performed to ensure better security and reliability of the network. The steps of this embodiment are therefore performed if necessary or on regular basis so as to prevent any compromise to the application credential.

In an example of the present disclosure, the updated application credential is generated by the application backend server or the application provisioner in response to change of conditions in the network.

Especially when node devices of the particular type are removed from or added to the network and therefore also the corresponding application, the application backend server may update the application credential, so as to reduce the risk of leakage of the old application credential.

Similarly, the updating step is also performed over a secure communication channel at a short range communication interfaces of the particular type of node devices. Again this is necessary for ensuring the secure transmission of the updated application credential which will replace the old one.

In an example of the present disclosure, each first type node device comprises a Bluetooth wireless communication interface operating as the short range communication interface, each second type node device comprises a Bluetooth wireless communication interface operating as the short range communication interface and a wireless cellular communication interface operating as the long range communication interface.

In an example of the present disclosure, the second type node devices are lighting devices, and the first type of node devices are an electronic device providing service other than lighting service.

In a second aspect of the present disclosure, there is provided an application provisioner for provisioning a plurality of operatively interconnected first type node devices in a network, each first type node device comprising a short range communication interface and configured for operating under control of a network backend server and an application backend server separate from the network backend server, the application provisioner is associated with the first type node devices and configured for operating according to the method according to the first aspect of the present disclosure.

In a third aspect of the present disclosure, there is provided a system for provisioning a plurality of operatively interconnected first type node devices in a network, the system comprising the network of the plurality of operatively interconnected first type node devices, a network backend server, an application backend server separate from the network backend server, and an application provisioner, wherein:
- the network backend server is arranged for joining the first type node devices into the network by provisioning the first type node devices with a network credential and generating network provisioning data comprising device specific network provision data;
- the application backend server is arranged for maintaining an application credential for the first type node devices;
- the application provisioner is associated with the first type node devices arranged for provisioning the application credential to the first type node devices.

In a fourth aspect of the present disclosure, there is provided a computer program product, comprising a computer readable medium storing instructions which, when executed on at least one processor, cause the at least one processor to operate a node device or an application provisioner in accordance with the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

In the following, the present disclosure will be described with reference to a scenario of extending an existing network comprising one type of node devices to include a different type of node devices. It will be understood by those skilled in the art that the solution of the present disclosure as described herein is also applicable to constructing a new network comprising different types of node devices.

The terms "commission", "commissioning", "provision" and "provisioning", will be used interchangeably to describe a process of setting up and configuring a node device from an initial operational state, i.e. after the node device is physically installed and powered up, into a fully operational state as a "claimed", "commissioned" or "provisioned" member of a network of operatively and communicatively interconnected node devices. Provisioning involves transmission of network configuration data or provisioning data or information to the node device, which provisioning data, among others, includes (a) network key(s) or credential(s), a network and an application key or credential for each node device. The provisioning data may further comprise other common network data for all node devices, as well as unique data for specific node devices, such as different dimming levels for different node devices, for example, in the case of a lighting system.

Figure 1:
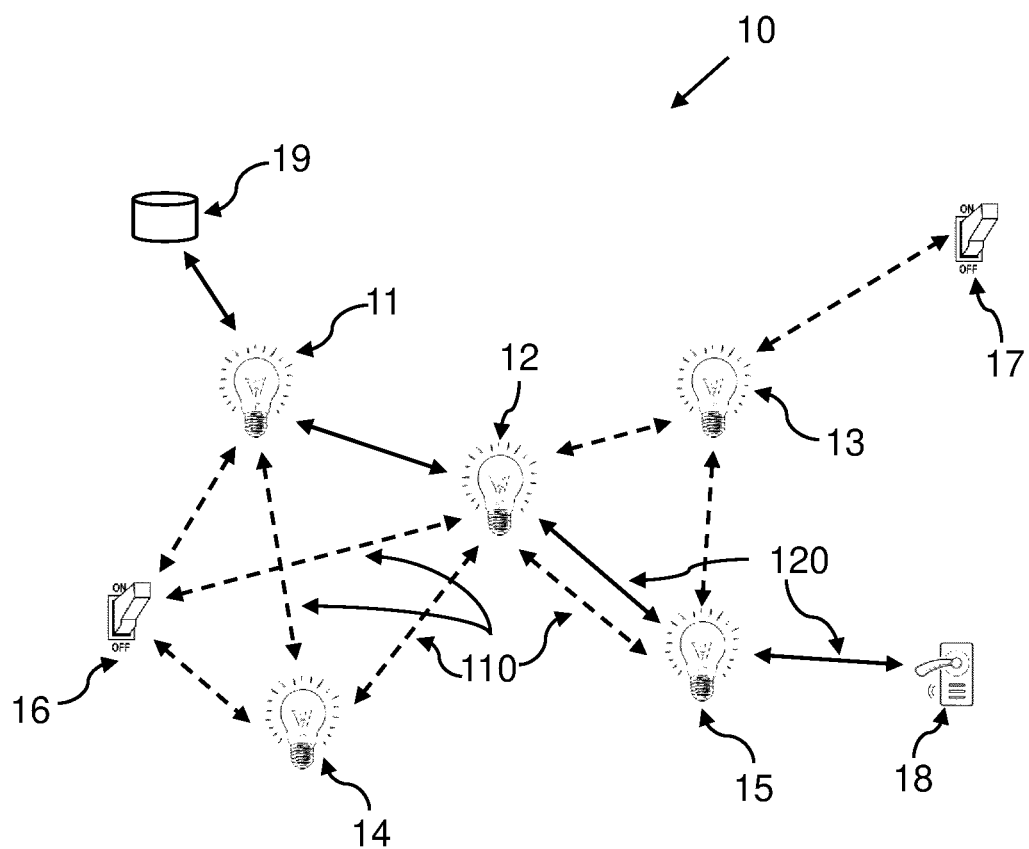
FIG. 1 illustrates a mesh network supporting different types of node devices and applications.

FIG. 1 illustrates a mesh network 10 supporting different type of node devices and applications. Two applications are illustrated In FIG. 1, that is, a lighting system and a door access control system. The lighting system comprises lighting devices 11 to 15 and switches 16 and 17, and the door access system comprises a door access control device 18. All node devices 11 to 18 communicate with control device such as a remote backend server or a local gateway or server 19, depending on the specific network configuration. It can be contemplated by those skilled in the art that any number of lighting devices, switches and door access controls may be deployed in the mesh network.

In FIG. 1, communication for the lighting application is indicated as dashed lines with numeral references 110, and communication for door access control is indicated as solid lines with numeral references 120. For simplicity reasons, all communication is not indicated with numeral references.

In the case of an indoor system as illustrated in FIG. 1, the lighting devices 11 to 15 and the switches 16 and 17 as well as the door access control device 18 are provided with short range communication capability for inter-node communications. It is also possible that the lighting devices 11 to 15 and the switches 16 and 17 are provided with long range communication capabilities, when the control device 19 is for example a backend server. In both cases, communication between the door access control device 18 and the control device 19, for example, exchange of messages such as access commands and application data, has to be routed via some of the lighting devices and the switches.

Specifically, communication between the local gateway and the door access control device 18 may be relayed though for example short range communication interfaces of the lighting devices 11, 12 and 15, as indicated by the solid lines 120.

For security considerations, for example, to prevent the door access control device 18 from being compromised by controlling the lighting devices relaying the access control messages, the lighting devices 11, 12 and 15 relay door access control messages without being able to decrypt the messages intended for the door access control 18. This is realized by using an application credential, such as an application key, for encrypting and decrypting the door access control messages exchanged between the door access control device 18 and the backend server 19.

The application scenario as described above with reference to FIG. 1 is also applicable to outdoor situations. As an example, an outdoor IoT network may comprise different types of node devices, such as lighting devices with both cellular and Bluetooth modules, and sensor nodes with only Bluetooth modules. The lighting devices in the network form an "infrastructural" scheme for relaying messages, based on which sensor nodes may be added when new applications are required. It is expected that new applications and services for different entities and organizations, such as public security and transportation, for example, may be further extended by adding different types of devices to the existing light network.

The later added or extended node devices for applications other than the lighting service will use the common light network to transmit data, both inter-node and to and/or from the backend server. As an example, sensor data that may be exchanged between a sensor device and a backend server may comprise motion data, sound data, image data, video data, temperature data, humidity data, pressure data, luminance data, chemical composition or substance data, olfactive data and tactile data.

An application key associated with a particular one of the applications and provisioned to the node devices running the particular application is used to protect the application data from other applications, including the light system. A prerequisite therefore is the secure provisioning of the application key to the corresponding node devices.

Figure 2:
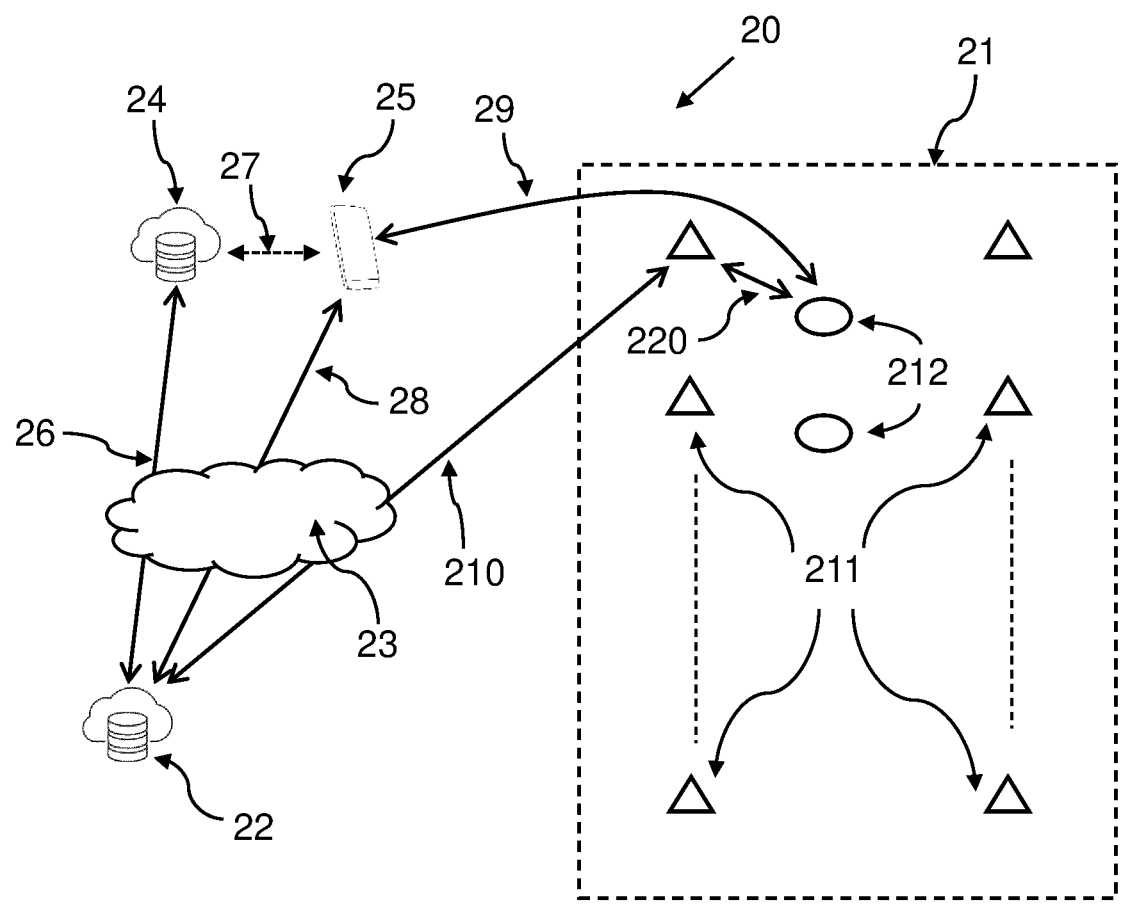
FIG. 2 is a schematic diagram illustrating main elements of a system for configuring or provisioning a particular type of node devices in a network comprising different types of node devices, in accordance with an embodiment of the present disclosure.

FIG. 2 is a schematic diagram illustrating main elements of a system 20 for configuring or provisioning a particular type of node devices in a network 21, in accordance with an embodiment of the present disclosure.

The network 21 is illustrated in FIG. 2 as comprising a second type of node devices 211 represented as triangles, such as lighting devices in an outdoor lighting system and a first type of node devices 212 represented as ellipses, such as surveillance cameras for monitoring traffic. The network 21 may further comprise other type of node devices associated with other applications, such as sensors configured for weather forecast, for example.

Each second type node device 211 is configured with a long range communication interface and a short range communication interface. The long range communication interface is arranged for communicating 210 over internet 23, such as a wireless cellular network, for example, with a network backend server 22, which is also configured with a long range communication interface. The short range communication interface typically operates for data exchange 220 between node devices.

It is also possible that only a limited number of second type node devices 211 are equipped with the long range communication interface, which will help to keep the cost of the whole network low.

Each of the first type node device 212 is configured with a short range communication interface for inter-node communication, that is, for data exchange 220 between node devices, such as with a second type node device.

The network backend server 22 is configured for setting up local mesh network, such as the network 21, and the creation of network configuration parameters comprising, among others, network credentials.

An application backend server 24, ABS, is configured for specific application management, with functionalities comprising maintaining an application key for a particular application running on the associated node devices. The ABS 24 as illustrated in FIG. 2 is associated with the first type node devices 212. It can be contemplated by those skilled in the art that multiple application backend servers owned by different application owners may exist in the network 21, depending on a number of applications operating in the network 21.

The ABS 24 may communicate 26 with the network backend server 22 over the internet 23 for exchanging information such as device specific network provisioning data for the first type node devices 212.

An application provisioner 25, which may be simply referred to as a provisioner, is configured for being used, for receiving or retrieving 28, for example via 27 the ABS 24, or alternatively generating, information for the node devices associated with the corresponding application and for distributing 29 the information to the associated node devices 212. The provisioner 25 may be a software application program running on a portable or mobile computing device comprising a mobile phone and may be downloaded from the network backend server 22 or from a source external to the system illustrated in FIG. 2, such as from a public app store, or a private source designated by the owner of the corresponding application.

Figure 3:
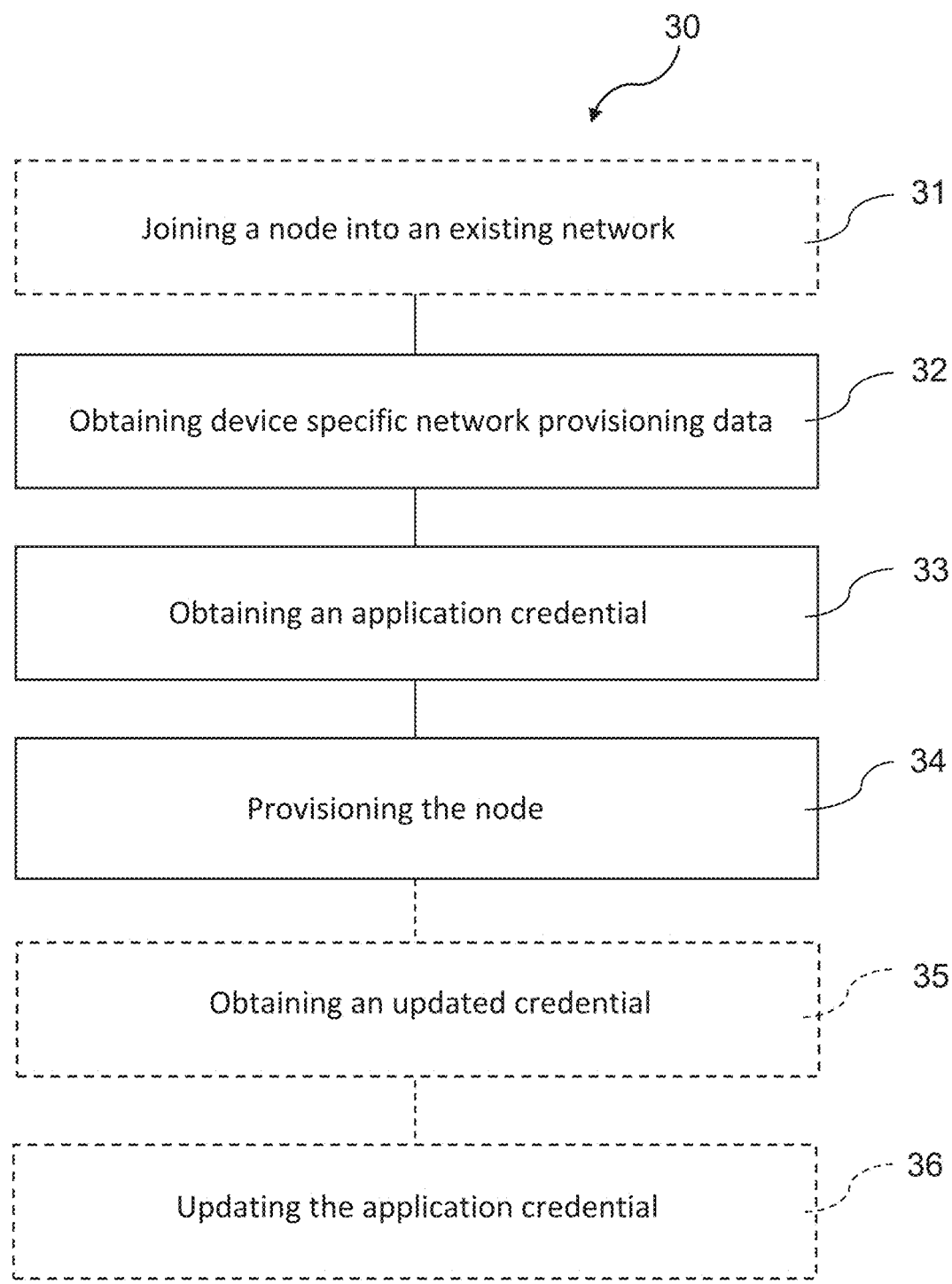
FIG. 3 illustrates, in a simplified flow diagram, steps of a method of provisioning a particular type of node devices in a network comprising different types of node devices, in accordance with an embodiment of the present disclosure.

FIG. 3 illustrates, in a simplified flow diagram, steps of a method 30 of provisioning a particular type of node devices in a network comprising different types of node devices running different applications, in accordance with an embodiment of the present disclosure.

The method 30 will be described in the following with reference to provisioning the first type of node devices illustrated in FIG. 2, which is also referred to as the particular type of node devices in the description.

For the purpose of the present disclosure, it is assumed that each first type node device, after installation and being powered on, is in an initial operational state of operating for being discovered by another node device through the short range communication interfaces.

Generally speaking, the method of provisioning a new node device into a network may be described as comprising two stages of phases. That is, in phase one, the node device is joined into the network and become one regular node device in the mesh network by obtaining and owning a network key, NetKey; and in phase two, the node device receives a specific application key AppKey from a provisioning app or simply a provisioner of the owner in an authenticated way. The method therefore provides a framework which allows different entities owning node devices in the network to maintain their own AppKeys separately. Detailed steps of the method is described hereafter.

As a preparatory step, at step 31, a first type node device is joined into an existing network, such as an outdoor lighting network comprising lighting devices with both a long range communication interface, such as cellular wireless communication module, and a short range communication interface, such as a Bluetooth mesh module.

During this join process, a set of network provisioning data including network credential, such as a NetKey for Bluetooth mesh network, a device ID, an unique device credential such as a Device key, address etc. is provisioned into the node device. Among all the network provisioning data, only the device ID and device credential are considered as "device specific network provisioning data", which will be provided to application backend server in subsequent steps of the method.

It is noted that the Network credential is only known to network backend server, which ensures that the application backend server cannot access the network infrastructure.

As an example, a method of joining the first type node device into the network may comprise the network backend server starting a provisioning procedure. Specifically, the network backend server may determine a second type node device as a proxy node device for provisioning the newly installed first type node device. During this procedure, a common network credential, such as a Bluetooth mesh network key NetKey, a unique network address, and a unique Device key DevKey will be distributed to the first type node device securely.

Data exchange between the network backend server and the first type node device is carried out via short range communication between the first type node device and the proxy second type node device and long range communication between the proxy second type node device and the network backend server. The communication may be based on cellular channel and protected by any existing technology, such as (Datagram) Transport Layer Security (D)TLS protocol.

For example, in the case that the short range communication interface is a Bluetooth enabled interface, the first type node device may be joined into the network according to Bluetooth standardized protocols for discovery of and data communication between Bluetooth enabled devices. Bluetooth related standards "Mesh profile specification 1.0.1", Section 2.2.3, 3.8, 3.95.4, and "Core Specification 5.1", Vol 1, Part A, Section 2.1.1.3 disclose the procedure in detail and are incorporated herein by reference. Data at the short range communication interfaces may also be exchanged over a secure channel, using available encryption techniques, for example.

As another example, for a ZigBee-enabled first type node device, the provisioning may be performed based on currently available ZigBee specification. It can be contemplated by those skilled in the art the first type node device may be joined into the network in other standardized or customized ways, depending on the communication protocol being used.

Thereafter, at step 32, a provisioner for provisioning the first type node device obtains device specific network provisioning data for the first type node device, from the network backend server.

The provisioner may be downloaded or received by an entity, such as a 3rd party application owner, which owns the newly added first type node devices from the network backend server, optionally via the ABS. Alternatively, the provisioner may also be obtained from a public directory such as Appstore, Google Play etc.

Optionally, the 3rd party application owner may authenticate itself as well as the ownership of the first type node devices to the network backend server with a method out of band, e.g. protected by legal document. The 3rd party application owner may have a registered account with the network backend server, from which the ABS associated with the first type node devices can retrieve information related to the first type node devices securely, including the device specific network provisioning data.

Those retrieved device specific network provisioning data related to the first type node devices may include a unique device identification, ID, and the corresponding DevKey. The retrieved information may be stored to the provisioner for later use.

In a network with multiple types of node devices, a provisioner is used for each type of node devices, this helps to keep credentials for a particular type of node devices only to the provisioner associated with the particular type of node device, thereby facilitating the security management of credentials.

One type of node devices may be different from another type of node devices in terms of functionalities, as illustrated by the node devices in FIG. 2, in which node devices 211 are lighting devices and node devices 212 are cameras.

It is also possible that functionally identical or similar node devices, when owned by different owners, may also be referred to node devices of different types. As an example, nodes for providing network access service owned by different service providers are considered as different types, and therefore requires separate provisioners to maintain and provision respective information including application credentials for the node devices.

Next, at step 33, the provisioner obtains an application credential for the first type node. The application credential is an application specific secret, an example being an application key, or other format of the secret, such as certificates or a pair of public/private keys. The application credential is known to the provisioner and the ABS but not known to the network backend server.

In practice, after receiving the device specific network provisioning data related with the first type node devices, the ABS will generate its own application key AppKey and has the same securely stored in the provisioner and the ABS. This AppKey is only known to the ABS itself, and obtainable by the provisioner from the ABS. This allows the credential for the particular type of node devices to be kept from being operated by other devices participating in the provisioning, thereby ensuring the security of the credential.

Alternatively, as the device specific network provisioning data received by the ABS is also stored at the provisioner, the provisioner may operate to generate the application credential as well. The generated application credential is then transmitted to and stored by the ABS.

Thereafter, at step 34, the first type node devices is provisioned by the provisioner, which distributes the application credential to the first type node device through short range communication between the provisioner and the first type node device. The application credential distributed or transmitted at the short range communication interfaces is exchanged over a secure channel, using available encryption techniques, for example.

For example, an operator with the provisioner, in which a list of node IDs and the corresponding DevKeys is stored, may be dispatched to the field to conduct the phase two provisioning of the first type node devices. The communication between the provisioner and the first type node nodes is over the short range communication interface such as over Bluetooth, of the first type node devices.

Moreover, before distributing the AppKey to the first type node devices, the provisioner and the first type node devices can authenticate each other based on the unique device IDs and the corresponding DevKeys. The DevKeys is therefore also used to protect the secure transfer of the AppKey from the provisioner to the second type node devices.

In such a way, even if another standard Bluetooth provisioning tool, from an attacker for example, may connect to the first type node devices via the Bluetooth interface, the provisioning tool will not be able to authenticate itself to the node device, due to the lack of knowledge of the DevKey. Therefore, it can prevent the transfer of a fake AppKey to the node device.

Optionally, the provisioner may notify the ABS and also the network backend server, via the ABS, that the provisioning of first type node device is finished.

The above described procedure of the present disclosure therefore ensures that the application credential is distributed to the right group or type of node devices in a secure and safe manner. This is especially advantageous for the network comprising various types of node devices owned by different entities or owners.

After all first type node devices are provisioned, the node devices and the related application can operate in a normal way. Data of the first type node devices, including both signalling messages and application data, will be encrypted or authenticated with the AppKey at the application layer and then further protected with NetKey. The protected data of the first type node device will then be transmitted securely over all mesh network, forwarded by any mesh node with a common NetKey. Only specific first type node devices with the right AppKey can further handle the data at application layer, e.g. data from a first type node device triggers only another first type node device for application.

Application data generated by the first type node device may also be transmitted to the network backend server via the second type node devices, with both long range cellular and short range Bluetooth mesh modules, as the proxy nodes. It is noted that that both the network backend server and the proxy node devices have no knowledge of the AppKey and thus they cannot access the application data of the first type node devices.

Optionally, the network backend server forwards the application data of the first type node devices, encrypted with AppKey, to the ABS which can retrieve the raw data by decryption with its own AppKey. Again the network backend server only perform the forward service and has no access to any application data of the first type node devices, as it has no knowledge of the AppKey.

In practice, the application credential for the second type node devices may be updated by ABS or the provisioner periodically or on-demand out of security considerations. In this case, the provisioner optionally at step 34 obtains the updated application credential, which is generated by the ABS or the provisioner itself.

The updated application credential may be generated in response to change of conditions in the network. As an example, especially when node devices of the particular type are removed from or added to the network and therefore also the corresponding application, the application credential may be updated by the application backend server, so as to reduce the risk of leakage of the old application credential.

At step 36, the provisioner may distribute the updated application credential to the first type node devices, replacing the old application credential. The updating step is also performed over a secure communication channel at a short range communication interfaces of the first type of node devices.

Figure 4:
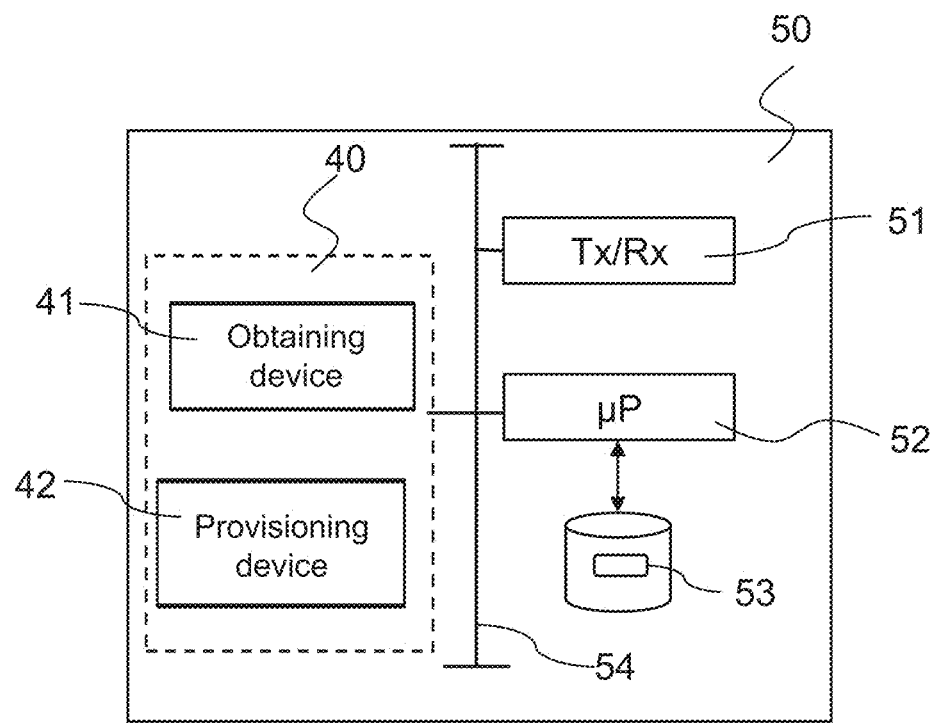
FIG. 4 is a schematic diagram illustrating an application provisioner for provisioning a particular type of node devices in a network comprising different types of node devices, in accordance with an embodiment of the present disclosure.

FIG. 4 schematically illustrates a provisioner 40 performing the above described method in accordance with the present disclosure.

The provisioner 40 may run on an electronic device 50. The electronic device 50 operates at least a short range communication interface 51, such as a network adapter or transceiver, Tx/Rx, module arranged for short-range wireless or wired exchange of messages or data packets with node devices in the network. Network protocols for exchanging data between the provisioner and the networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The electronic device 50 further comprises at least one microprocessor, μP, or controller 52, and at least one data repository or storage or memory 53, among others for storing operational software and provisioning data or information including the application credential for the particular type of node devices.

The at least one microprocessor or controller 52 communicatively interacts with and controls the short range communication interface 51, and the at least one repository or storage 53 via an internal data communication and control bus 54 of the electronic device 50.

The provisioner 40 runs on the electronic device 50 and functionally may comprise an obtaining device 41 and a provisioning device 42, respectively configured for performing the steps of the method 30 in accordance with the present disclosure.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of provisioning a plurality of operatively interconnected first type node devices in a network, each first type node device comprising a short range communication interface and configured for operating under control of a network backend server and an application backend server separate from said network backend server, said method comprises method performed by an application provisioner associated with said first type node devices comprising the steps of:
   obtaining device specific network provisioning data for and identifying said first type node devices from said network backend server;
   obtaining an application credential for said first type node devices from said application backend server, said application credential being known to said application backend server and unknown to said network backend server, and
   provisioning said first type node devices by distributing said application credential to each of said first type node devices over a short range communication interface of said first type node device upon successfully mutual authentication with said first type node device using said device specific network provisioning data;
   wherein each first type node device is joined to said network under control of said network backend server, prior to said step of obtaining said device specific network provisioning data for said first type node devices.

2. The method according to claim 1, wherein said network further comprises a plurality of operatively interconnected and provisioned second type node devices, each of said second type node devices comprises a short range communication interface and a long range communication interface, each first type node devices is joined to said network by communication, with said network backend server, over said short range communication interface of said first type node device and a long range communication interface and a short ranged communication interface of at least one of said second type node devices functioning as a proxy node device for said communication.

3. The method according to claim 1, wherein said device specific network provisioning data for said first type node devices is generated during a network joining process and comprises a unique device identification and a corresponding device credential of each first type node device.

4. The method according to claim 1, wherein said device specific network provisioning data is obtained from said network backend server via said application backend server.

5. The method according to claim 1, wherein said application credential is generated by said application backend server.

6. The method according to claim 1, wherein said application credential is generated by said application provisioner associated with said first type node devices.

7. The method according to claim 1, further comprising the steps of:
   obtaining an updated application credential for said first type node devices; and
   updating said application credential of said first type node devices with said updated application credential.

8. The method according to claim 1, wherein said updated application credential is generated by said application backend server or said application provisioner in response to change of conditions in said network.

9. The method according to claim 1, wherein, each first type node device comprises a Bluetooth wireless communication interface operating as said short range communication interface, each second type node device comprises a Bluetooth wireless communication interface operating as said short range communication interface and a wireless cellular communication interface operating as said long range communication interface.

10. The method according to claim 1, wherein said application provisioner is available from said network backend server or a network source external to said hybrid network.

11. The method according to claim 1, wherein said second type node devices are lighting devices, and said first type node devices are electronics device providing service other than lighting service.

12. A system for provisioning a plurality of operatively interconnected first type node devices, comprising a network of said plurality of operatively interconnected first type node devices, a network backend server, an application backend server separate from said network backend server, and an application provisioner, wherein:
   said network backend server is arranged for joining said first type node devices into said network by provisioning said first type node devices with a network credential and generating network provisioning data comprising device specific network provision data; and
   said application provisioner is associated with said first type node devices arranged for provisioning said application credential to said first type node devices, wherein said application provisioner is configured to:
   obtain said device specific network provisioning data for and identifying said first type node devices from said network backend server;
   obtain said application credential for said first type node devices from said application backend server, said application credential being known to said application backend server and unknown to said network backend server, and
   provision said first type node devices by distributing said application credential to each of said first type node devices over a short range communication interface of said first type node device upon successfully mutual authentication with said first type node device using said device specific network provisioning data;
   wherein each first type node device is joined to said network under control of said network backend server, prior to said step of obtaining said device specific network provisioning data for said first type node devices.

13. The system according to claim 12, wherein said application backend server is arranged for maintaining an application credential for said first type node devices.

14. A non-transitory computer computer readable medium comprising instructions which, when executed on at least one processor, cause said at least one processor to carry out the method according to claim 1.

* * * * *